United States Patent [19]
Ronay

[11] Patent Number: 5,876,490
[45] Date of Patent: Mar. 2, 1999

[54] POLISH PROCESS AND SLURRY FOR PLANARIZATION

[75] Inventor: Maria Ronay, Briarcliff Manor, N.Y.

[73] Assignee: International Business Machines Corporatin, Armonk, N.Y.

[21] Appl. No.: 789,229

[22] Filed: Jan. 24, 1997

Related U.S. Application Data

[60] Provisional application No. 60/033,278 Dec. 9, 1996.

[51] Int. Cl.$^6$ ................................. B24B 1/00; C09G 1/02
[52] U.S. Cl. ................................ 106/3; 439/693; 51/509
[58] Field of Search ................................. 106/3, 491, 450, 106/499; 438/693; 51/309; 451/42, 41

[56] References Cited

U.S. PATENT DOCUMENTS

| | | | |
|---|---|---|---|
| 2,556,615 | 9/1991 | Keilholtz et al. | 41/42 |
| 4,478,883 | 10/1984 | Bupp et al. | 427/97 |
| 4,554,182 | 11/1985 | Bupp et al. | 427/304 |
| 4,752,628 | 6/1988 | Payne | 523/122 |
| 5,225,034 | 7/1993 | Yu et al. | 156/636 |
| 5,262,354 | 11/1993 | Cote et al. | 437/195 |
| 5,304,284 | 4/1994 | Jagannathan et al. | 156/666 |
| 5,445,996 | 8/1995 | Kodera et al. | 437/225 |
| 5,480,476 | 1/1996 | Cook et al. | 106/3 |
| 5,603,739 | 2/1997 | Neuland | 106/3 |
| 5,636,296 | 6/1997 | Garino | 106/456 |

FOREIGN PATENT DOCUMENTS 0 373 501 A2  6/1990  European Pat. Off. .
WO 96/38262  12/1996  WIPO .

OTHER PUBLICATIONS

W.L. Silvernail et al, The Mechanism of Glass Polishing, The Glass Industry, vol. 52, pp.172–175, May 1971.

*Primary Examiner*—Melissa Bonner
*Attorney, Agent, or Firm*—Pollock, Vande Sande & Priddy

[57] ABSTRACT

A slurry containing abrasive particles and exhibiting normal stress effects. The slurry further contains non-polishing particles resulting in reduced polishing rate at recesses, while the abrasive particles maintain high polish rates at elevations. This leads to improved planarization.

34 Claims, 3 Drawing Sheets

POLISH PROCESS AND SLURRY FOR PLANARIZATION

DESCRIPTION

The present application claims priority to co-pending provisional application No. 60/033,278 filed Dec. 9, 1996.

TECHNICAL FIELD

The present invention is concerned with slurry compositions. The slurry compositions are useful for polishing and especially for planarizing surfaces in the microelectronics industry. The present invention is also quite useful for polishing non-planarized surfaces having large radii of curvature with respect to the feature size or surface variations being polished such as the convex and concave surfaces of mirrors and lens. The present invention makes it possible to achieve a significantly greater degree of planarization than was previously possible. The present invention also makes it possible to use polishing pads of increased hardness without causing scratches.

BACKGROUND OF THE INVENTION

Historically the goal of polishing is to take out scratches from an otherwise planar surface. Here the polish rate at the sharp peaks is higher than at the indentations due to the stress concentrations at the peaks. This automatically leads to the elimination of the peaks.

Contrary to the above, the goal of polishing in the microelectronics industry is to planarize a scratch-free surface. Most often the surface morphology includes wide plateaus adjacent to wide valleys resulting from the conformal nature of most deposition processes when considered on a large scale. Since wide plateaus do not present significant stress concentrations, they do not polish much faster than the wide valleys. Consequently, polishing is inefficient in achieving planarization, and the starting surface morphology, (steps) is planarized only to a limited extent.

The wider the features, the more difficult planarization becomes. Since a soft pad is more conformal than a hard pad, its use practically excludes the possibility to planarize. The use of a hard (stiff) pad, while more favorable from a planarization point of view, still does not eliminate the problem, since while the degree of conformity decreases, it does not disappear. In addition, hard pads cause scratches on the surface with the abrasive or the polishing debris, which cannot be tolerated because these scratches in turn can cause shorts.

The requirement for planarity is the most stringent in the shallow trench isolation (STI) application of $SiO_2$ because this feature is at the base, and every subsequent layer will replicate any non-planarity of the surface topography. Because of the lack of a truly planarizing polishing process, currently the problem is addressed by the deposition of "dummy structures" or "polish-stops" which elevate the valley areas to the height of the plateau areas. This requires extra design effort, extra patterning, extra deposition reactive ion etching and polishing steps. The total number of these expensive auxiliary steps often reaches six, where if planarization of the original polishing process were efficient, one step would suffice.

Concerning oxide planarization, it is important to appreciate the fact that oxide polishing results in an even lesser degree of planarization than does metal polish. This problem is reduced in interlevel dielectrics by increasing the initial thickness of the oxide, since planarization improves when an increasing amount is removed. While this approach increases the cost of planarization, the extent of planarization is still not good enough for very large scale integration schemes.

SUMMARY OF INVENTION

An object of the present invention is to provide a planarization process having a polish rate significantly faster in the elevated areas (plateaus) than in the recessed areas (valleys), which therefore achieves a significantly greater degree of planarization than was previously possible. The present invention also permits the use of harder pads without causing scratches by means of coating the scratch-causing polishing debris.

More particularly, the present invention is directed to a polish slurry that contains abrasive particles and exhibits normal stress effects. The slurry compositions of the present invention contain as a portion of the suspended particles, particles that exhibit reduced or diminished polishing action and normal stress effect. e.g. they climb up into recesses on the pattern and cause a reduced polish rate there. This is preferably achieved by a slurry that contains abrasive particles and a polyelectrolyte. The polyelectrolyte adsorbs on a fraction of the abrasive particles and these exhibit normal stress effects reducing the polish rate at recesses. The concentration of the polyelectrolyte is about 5–50 percent of the weight of the abrasive particles.

According to an alternative specific embodiment, the polish slurry can contain abrasive particles and water-insoluble polymer particles. A still further specific embodiment is concerned with a polish slurry containing abrasive particles and surfactant micelles.

The present invention is also concerned with planarizing a surface. The process includes providing on the surface to be planarized the above described slurries. The surface is then planarized by contacting with a polishing pad and preferably with a stiff polishing pad providing a high rate of shear in the slurry by high rotational speed of platen and carrier.

The present invention may also be used to polish non-planarized surfaces having large radii of curvature with respect to the feature size or surface variations being polished, such as for example, convex and concave surfaces of mirrors and lenses. In addition to utilizing that component of the normal stress effect which makes the polymer particles climb up into recesses (and reduces polish rate there, leading to planarization on a microscopic scale), another aspect of the normal stress effect, namely that polymer particles also tend to migrate laterally towards the center of the surface being polished, can also be utilized for macroscopic shaping of a surface, for example producing a curvature.

BEST AND VARIOUS MODES FOR CARRYING OUT INVENTION

Figure 1:
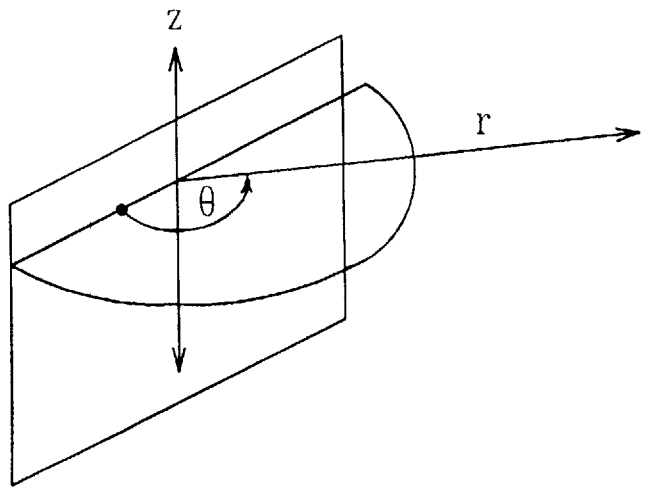
FIG. 1 illustrates a cylindrical coordinate system to represent the conditions of polishing.

According to the present invention a polish slurry that contains abrasive particles and exhibits normal stress effects is provided. The non-linear elasticity of some non-Newtonian polymer solutions and polymeric fluids manifests itself in the development of normal stress differences that arise perpendicular to the direction of shear. To explain this effect, one can approximate the conditions of polishing with torsional flow between two rigid parallel disks, and use a cylindrical coordinate system, z, θ, r (FIG. 1). Here one disk at z=0 has the angular velocity of $\Omega_0$, and the other disk at z=d has the angular velocity of $\Omega_d$, and $\Delta\Omega=\Omega_d-\Omega_0=0$.

The rate of shear is $X=r\Delta\Omega/d$, where r is the radial distance from the center of the disk. The shearing stresses $T_{zr}=T_{\theta r}=0$, $T_{z\theta}=\tau(X)$. Particularly important here is the first normal stress difference, $T_{zz}-T_{rr}=\sigma_1(X)$.

Figure 2:
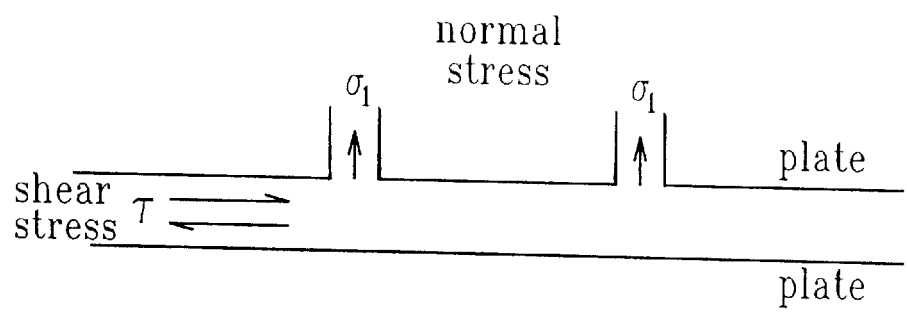
FIG. 2 is an illustration of the first normal stress difference, $\sigma_1$ (X) arising in a polymeric fluid subjected to shear between rotating disks.

The first normal stress difference causes the fluid to flow radially inward between two rotating plates, and tends to separate the plates. Drilling holes into the upper disk and placing capillaries through the holes results in the fluid climbing up in the capillaries. This is illustrated in FIG. 2. It is important to note that the higher the rate of shear, the higher $\sigma_1(X)$ becomes. For a polymer solution $\sigma(X)$ can be larger than $\tau(X)$, while for a Newtonian fluid $\sigma_1=0$.

The polishing slurries used in the prior art are aqueous suspensions of abrasive particles, and exhibit Newtonian behavior. i.e., the first normal stress difference is zero. However, non-Newtonian behavior can be imparted to such slurries by the addition of such polyelectrolytes according to the present invention. which by themselves, in solution, exhibit normal stress effects. and which adsorb on the abrasive particles. The polyelectrolytes impart the same behavior to the abrasive particles. The polyelectrolyte contains a polymer chain and a functional group, which, by electron transfer can chemisorb on differently charged surfaces. Polyions. that are highly attracted to the surface of the abrasive particles, achieve adsorption behavior of the Langmuir type, and the polymer lies flat on the surface of the abrasive particle until a "monolayer" coverage is achieved. The polyion will, of course, adsorb on the surface of the workpiece (wafer) as well in the form of a monolayer.

Among the aspects recognized by the present inventor about polymer-coated abrasive particles are the following:
1. Their polishing action is greatly reduced. Which results in diminishing polishing rates.
2. Polymer-coated abrasive particles act as polymeric macromolecules, and climb up in recess spaces perpendicular to the direction of shear (see FIG. 2).

On the other hand, among the aspects recognized by the present inventor about uncoated abrasive particles are the following:
1. Polish rate depends on the volume-concentration of uncoated abrasive particles.
2. Uncoated particles do not climb up in recess spaces perpendicular to the direction of shear.

Figure 3:
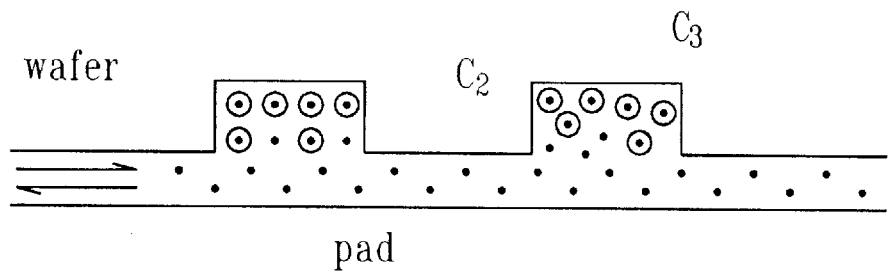
FIG. 3 illustrates the relative location of the coated particles and uncoated ones due to shear pursuant to the present invention, the wafer being upside down during polishing.
Figure 4:
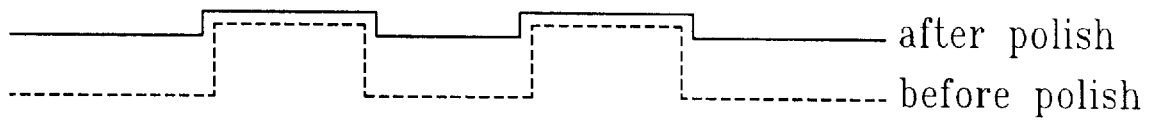
FIG. 4 illustrates planarization being achieved according to the present invention.

In order to take advantage of these observations to achieve planarization, the quantity of polyelectrolyte in an abrasive suspension is such that a fraction of the particles will be coated with the polyelectrolyte, while another fraction of the abrasive particles will remain uncoated. In addition, among the aspects recognized by the present invention, about a slurry containing both coated and uncoated abrasive particles are as follows:

1. The normal-stress effect separates the coated particles from the uncoated particles. The coated particles climb up and accumulate in the recesses of the pattern (valleys), while the uncoated abrasive particles remain in the lower portion of the slurry, i.e., at the elevations (fields) of the pattern, as illustrated in FIG. 3. In FIG. 3, 1 represents the coated particles and 2 represents the uncoated ones. The surface to be planarized is placed upside down on the polishing pad.
2. The polymer-coated particles accumulate in the recesses of the pattern and since they have hardly any polishing action, the polish rate in the recesses is very slow.
3. The uncoated abrasive particles accumulate at the elevations or fields of the pattern, and since they have undiminished polishing action, here the polishing rate is fast.
4. A fast polish rate at the elevations and a slow polish rate in the recesses (valleys) leads to planarization, as shown in FIG. 4, wherein the dotted line represents the profile before polishing and the solid lines. the profile after polishing.

Also according to preferred aspects of the invention, the polishing pads should possess the following characteristics:
1. The polishing pad is preferable stiff and does not deform completely into the sunken areas of the pattern, because if it does so, there will be no room for the separation of coated and uncoated abrasive particles. This preference of stiffness thus necessitates the use of harder pads. Harder pads tend to cause scratches with the polishing debris. This problem is overcome by using such polyelectrolytes for coating a fraction of the abrasive particles Which also act as dispersants for the polishing debris. Dispersing the polishing debris prevents scratching and permits the use of harder pads. "Harder pads" according to the present invention are defined as those to achieve a plananrization ratio of larger than 3 with conventional slurries, where planarization ratio refers to the initial step height divided by the final (after polish) step height. Accordingly, "harder pads" suitable for use in the present invention can be readily determined by those skilled in the art once aware of this disclosure without undue experimentation.
2. The polishing pad should preferably be plain, without perforations. If perforations are present, the coated particles will accumulate there, reducing their number in the recesses of the pattern on the wafer that is to be planarized.

Preferably the slurry comprises abrasive particles and polyelectrolyte. The polyelectrolyte has ionic moieties of a charge different from the ionic charge associated with the abrasive particles. For example, when the ionic charge associated with the abrasive particles is anionic (i.e., negative) the polyelectrolyte is cationic, and when the charge associated with the abrasive particles is cationic, then the polyelectrolyte is anionic. When the charge associated with the abrasive particles is neutral, then the polyelectrolyte can be cationic and/or anionic.

The term polyelectrolyte refers to a substance that contains polyions, which are macro-molecules having a large number of ionizable groups. To preserve the electroneutrality of a polyelectrolyte substance, the polyion charges must be compensated by counterions, typically ions of low molecular weight such as H+, or Na+. Unlike most uncharged polymers, polyelectrolytes usually are soluble in polar solvents. e.g. water. With regard to their protonation equilibria in aqueous solution, they can be classified as polyacids, polybases, or, if both acidic and basic groups are present, as polyampholytes.

The polyelectrolytes impart normal stress effects to the slurries. In solution, the polyelectroltes exhibit normal stress effects and their adsorption on the abrasive particles impart the same behavior to the particles. This differs from prior art polishing slurries which exhibit no normal stress effects.

According to the present invention, in order to achieve planarization, the quantity of polyelectrolyte in the abrasive suspension is such that a fraction of the particles will be coated with the polyelectrolyte, while another fraction of the abrasive particles will remain uncoated. In order to achieve this, the weight percent of the polyelectrolyte should be about 5 to about 50 percent, preferably about 15 to about 30 percent by, weight, and most preferably about 20 percent by weight of the abrasive particles in the slurry. These ratios depend somewhat on the relative size of the abrasive particles and the polyelectrolyte.

The ionizable or anchoring groups by which the polyions can be bound to the polishing abrasive particles include:

1. Acidic groups such as carboxyl groups, for example in poly(acrylic acid), poly(methacrylic acid), poly(methyl methacrylic acid), poly(maleic acid) or in saturated or unsaturated poly(carboxylic acid)s. Also, phosphoric acid and/or sulfonic acid groups incorporated into a polymer may act as acidic functional groups.
2. Basic groups including nitrogen containing groups, such as polymers with amino, amide, imide, vinyl pyridine, piperidine and piperazine derivatives.

For the polyions to have a high binding energy to the surface of the abrasive particles, it is desirable that the polyions have a high charge density. The addition of electrolytes, for example, increases the strength of a weak polyacid, such as polyacrylic acid, and thus, its adsorption on the abrasive particle. For instance, see Example 2.

For the polyelectrolyte to have a strong binding energy to the surface of the abrasive, polyacids should be used to coat abrasives with a basic character, such as poly(acrylic acid) for alumina abrasive. On the other hand, polybases should be used to coat abrasives with an acidic character, such as for example poly(ethylenimine) to coat silica abrasive. Polishing abrasives with a near-neutral character, such as zirconia or ceria may be coated with either acidic or basic polyions, or polyampholytes.

The following Table 1 illustrates some ionizable chain molecules suitable for the present invention.

TABLE 1

Examples of some ionizable chain molecules used in planarizing slurries poly (acrylic acid)

$$\left[ \begin{array}{c} -CH_2-CH- \\ | \\ COOH \end{array} \right]_n$$

poly (methacrylic acid)

$$\left[ \begin{array}{c} CH_3 \\ | \\ -CH_2-CH- \\ | \\ COOH \end{array} \right]_n$$

TABLE 1-continued

Examples of some ionizable chain molecules used in planarizing slurries poly (vinylsulfonic acid)

$$\left[ \begin{array}{c} -CH_2-CH- \\ | \\ SO_3H \end{array} \right]_n$$

poly (acrylic acid-co-maleic acid)

$$\left[ \begin{array}{ccc} -CH_2-CH-\!\!\!-CH-\!\!\!-CH- \\ | & | & | \\ COOH & COOH & COOH \end{array} \right]_n$$

poly (vinylamine)

$$\left[ \begin{array}{c} -CH_2-CH- \\ | \\ NH_2 \end{array} \right]_n$$

poly (ethylenimine)

$$\left[ \begin{array}{c} -CH_2-CH_2-N- \\ | \\ H \end{array} \right]_n$$

poly (4-vinyl pyridine)

$$\left[ \begin{array}{c} -CH_2-CH- \\ \bigcirc \\ N \end{array} \right]_n$$

In particular, in the polyelectrolyte additives n, the repeat number of the monomer unit, preferably should be in the range of 5–200, bringing the preferred molecular weight regime of polyelectrolytes between about 500 and 10,000.

Almost all oxide polishing in the microelectronics industry applies colloidal silica slurry in the alkaline pH regime. According to the present invention, preferably the planarizing polyion additive has a nitrogen containing group, such as amino, amide, imide, vinyl pyridine, piperidine or piperazine derivatives. The most preferred additive is polyethylenimine with a molecular weight of about 2,000. The pH of the planarizing slurry should be between 9–11. Since colloidal silica polishing slurries consist of silica particles and deionized water, preparing the planarizing slurries includes diluting the aqueous silica slurry to the desired solids concentration, adding the required amount of the aqueous solution of the polyethylenimine and stirring for at least one hour before use to establish the adsorption equilibrium. Any hard polishing pad may preferably be used with these planarizing slurries that do not contain perforations or embossed patterns.

$ZrO_2$ and $CeO_2$ abrasives can also be used to polish $SiO_2$. Since their isoelectric points are near neutral, both acidic and basic polyions adsorb on them, thus poly(acrylic acid) as well as polyethylenimine may serve as planarization additives for zirconia and ceria slurries. Equally useful are polyelectrolytes, which have both nitrogen-containing and carboxyl groups in their structure, such as poly(aminoacid)s and ammonium polyacrylate. The molecular weight of the additives are preferably in the 500–10,000 regime. Any hard polishing pad may preferably be used with these planarizing slurries which do not contain perforations or embossed patterns.

In the metal planarization area, the most important application of the present invention is aluminum and aluminum alloy planarization. The details of an exemplary process are found in the examples.

In the case of tungsten planarization, typically the slurry contains alumina abrasive and ferric nitrate oxidant. According to the present invention, preferably a carboxyl-containing containing polyectrolyte, such as poly(acrylic acid), is employed. The polyion additive improves planarization, and prevents the scratching of the oxide, as observed in such polishing processes.

In the case of copper polishing, typically alumina slurry and an acidic oxidant are used. According to the present invention, preferably a carboxyl-containing polyelectrolyte, such as poly(acrylic acid), poly(methacrylic acid) and polymaleic acid is employed. The polyion additive improves planarization and prevents scratches caused by the hard pad.

In addition to the polyelectrolyte, which coats a portion of the abrasive particles, the slurry preferably includes a dispersant for dispersing the polishing debris and thereby prevents it from causing scratches and permits the use of harder polishing pads. Since low molecular weight polyions with high charge density can function as polishing debris dispersants, if the polyelectrolyte is properly selected it can perform both functions. In particular, in the polyelectrolyte additives n, the repeat number of the monomer unit, preferably should be in the range of 5–200, bringing the preferred molecular weight regime of polyelectrolytes between about 500 and 10,000, preferably about 1,000 to about 5,000 and most preferably about 2,000. In the event the polyelectrolyte does not function as a dispersant, the slurry can include conventional dispersants such as the amorphous polyphosphate salts, acrylamide polymers, polymaleates, tannins, lignins and alginates.

The abrasive particles employed include those conventionally used, as well as polishing slurries that contain conventional abrasive particles and a dual-valent rare earth ion or suspension of its colloidal hydroxide, wherein the rare earth ion is in its higher valent form, as shown in the examples in this application. Examples of some suitable rare earths are $Ce^{4+}$, $Pr^{4+}$ and $Tb^{4+}$ or suspensions of their colloidal hydroxide, such as Ce(OH)4. The dual-valent rare earth or rare earth hydroxide colloid acts as an oxidation catalyst and source of OH ions in the slurry.

Dual-valent rare earth additives, such as those disclosed in my co-pending U.S. patent application Ser. No. 08/756,361 the entire disclosure of which is hereby incorporated by reference, may be part of the polishing slurry.

Examples of suitable abrasive particles include alumina, ceria, silica, and zirconia. The abrasives typically have a particle size of about 30 to about 200 nm and preferably about 75 to about 100 nm.

The slurry compositions that contain the polyelectrolyte are preferably prepared by adding the polyelectrolyte to the slurry already containing the abrasive particles, thereby coating a fraction of the abrasive particles "in situ." In an alternative procedure, a fraction of the abrasive particles can be precoated and then admixed with the slurry containing the remaining abrasive particles which will be uncoated. In addition, it may be desirable to pretreat a portion of the abrasive particles to render them more susceptible to adsorption of the polyelectrolyte from the slurry. For instance, salts of the higher valent form of dual-valent rare earth elements or other oxidants such as ferric nitrate are suitable for this purpose.

According to an alternative embodiment, non water-soluble polymer can be employed as the non-polishing particles in place of or in addition to the polyelectrolyte-coated abrasive particles. Suitable synthetic organic polymers include polystyrene. butadiene rubbers and water-dispersable polyurethane powders. The polymers are in the form of submicron powder particles. If desired, the polymer particles can be treated with a surfactant such as sodium lauryl sulfate, to render them hydrophilic.

When employed, the polymer particles are typically present in amounts of about 5 to about 50 percent and more typically about 15 to about 30 percent by weight and preferably about 20 percent by weight of the abrasive particles in the slurry.

In a further embodiment, surfactant micelles can be employed as the non-polishing particles in place of or in addition to the polyelectrolyte-coated abrasive particles. Surfactant molecules or ions of concentrations above the critical micelle concentration (CMC) associate into aggregates called micelles. The orientation of surfactant ions in micelles in aqueous solution is such that the hydrophilic moieties are exposed to the water. The micelles most often are of spherical shape representing an aggregation number between 20–100. For this implementation to be used for example in an alumina slurry, sodium lauryl sulfate surfactant may be used in a concentration above the CMC, typically about 0.1 to about 2% by weight, and preferably at least about 0.25% by weight. Of course, the surfactant can be cationic, anionic or nonionic, as desired. The surfactant concentration does not depend on abrasive concentration.

If desired, mixtures of two or more of the above types of non-polishing particles can be employed.

The slurry is preferably an aqueous slurry. though non-water-based slurries, such as polysiloxane fluids, and poly-isobutylene in cetane or a mixture of water based and non-water-based slurries are included in the present invention, if at least part of the slurry exhibits normal stress effects.

The parameters of the polishing or planarizing can be determined by those skilled in the art, once aware of this disclosure, without exercising undue experimentation. For instance, the speed of rotation of the polishing pads and also of the wafer is about 10 to about 150 rpm and pressure about 2 to about 10 psi. A wafer may be in the range of 100 to 300 mm in diameter. When polishing a mirror or lens, a rate towards the lower end is typically employed. This can be achieved by using the higher amounts of non-polishing particles and/or a lower pressure.

The Following non-limiting examples are presented to further illustrate the present invention.

COMPARISON EXAMPLE 1

Into a magnetically stirred vessel are added about 4 liters of deionized water followed by about 1 liter of colloidal aqueous alumina slurry having a peak particle size of 75 nanometers and a solids content of 6 wt. %. About 21 g of $(NH_4)_2Ce(NO_3)_6$ is dissolved in about 1 liter of deionized water and added to the above. The slurry is then stirred for at least 20 minutes, resulting in about 6 liters of slurry having an alumina content of 1 wt. %. The ceria salt serves as an oxidant.

The wafer to be polished has wire-bonding pads of 100 um×100 um dimensions and an etch-depth of 0.8 um. Surface profile taken before polishing shows 0.8 um steps on the surface, indicating a perfectly conformal deposition. These are the steps which need to be planarized.

A soft polyurethane pad, Polytex™ from Rodel Corporation, is used since the use of a harder pad creates "black debris," which scratches the aluminum film. Scratches on other metallization levels reduce short yield.

Polishing of the 1.1 um thick Al-0.5 wt. % Cu alloy film took place on a Westech 372 polishing machine with the wafer being polished located above the polishing pad, using 6 psi downforce, and 2 psi backpressure. The revolution of the platen was 75 rpm, while that of the carrier was 50 rpm. The slurry flow was 200 ml/min.

Figure 5:
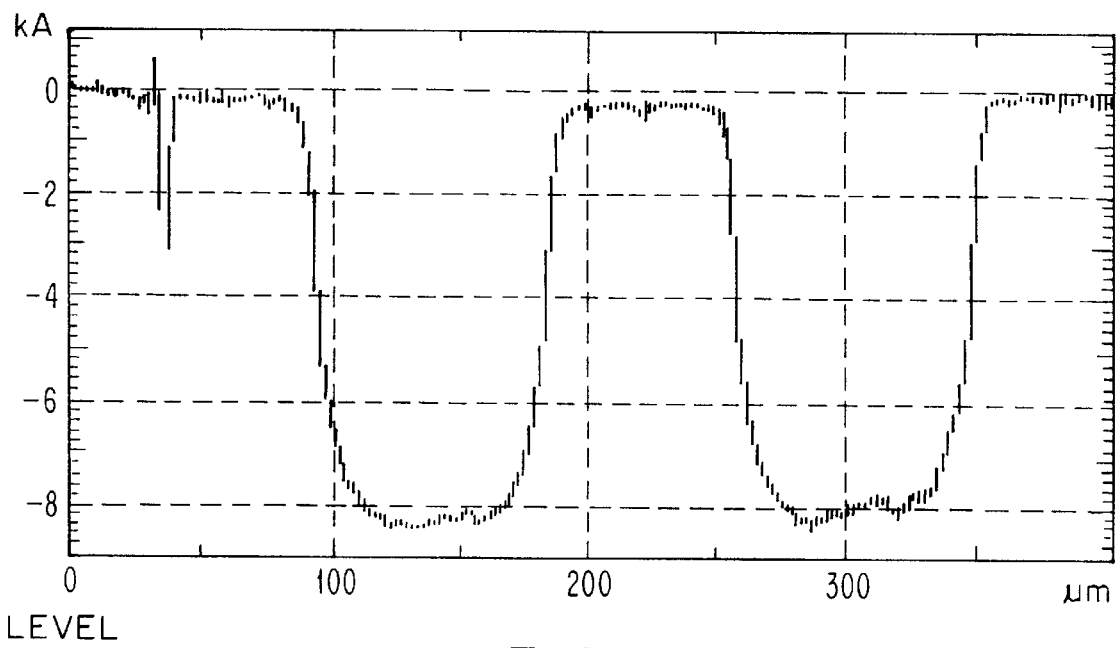
FIG. 5 shows a surface profile obtained not in accordance with this invention.

FIG. 5 shows the surface profile of the pads after the removal of the aluminum alloy. While the corners of the pattern became rounded, the step height remained the same 0.8 um. thus, no planarization took place.

EXAMPLE 2

Into a magnetically stirred vessel are added about 3 liters of deionized water followed by about 1 liter of colloidal aqueous alumina slurry having a peak particle size of 75 nanometers and a solids content of 6 wt. %. About 21 grams of $(NH_4)_2Ce(NO_3)_6$ are dissolved in 1 liter of deionized water, added to the above slurry and stirred for at least 20 minutes. Next, about 20 ml of a 65 wt. % poly(acrylic acid) solution, in which the molecular weight of the poly(acrylic acid) is 2,000 are added to the slurry and the measuring cylinder in which the poly(acrylic acid) was measured is washed with 1 liter of deionized water into the slurry. The slurry is stirred for at least one hour to reach adsorption equilibrium.

The slurry prepared is 6 liters, which contains 1 wt. % alumina and about 0.2 wt. % poly(acrylic acid). In addition to serving as an oxidant, the ceria salt also promotes the adsorption of the poly(acrylic acid) on the alumina abrasive.

Figure 6:
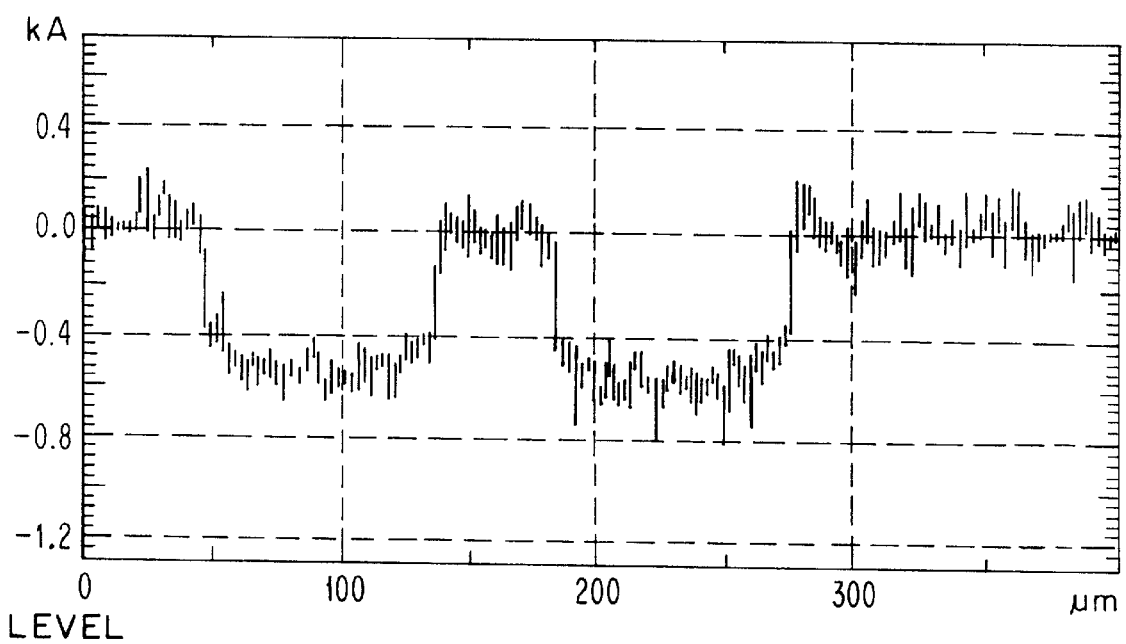
FIG. 6 shows a surface profile obtained in accordance with the invention.

For the planarizing, a harder pad than used in Comparison Example 1 is used. The pad is available as Pedro pad from Freudenberg Company. It is a non-woven pad made by laying down rayon fibers cut to 1.5–3 inches length. Subsequently, an acrylic-butadiene rubber binder is placed on the fibers, and the binder is cured to attain the desired viscoelastic properties. The same polishing conditions and wafer as described above in Comparison Example 1 are used. No black-debris formation is observed during polishing. After the removal of the aluminum alloy from the fields surrounding the wire bonding pad by polishing the surface profile of the pads is given in FIG. 6. The figure shows a step height of only 0.06 um indicating a more than one order of magnitude improvement in planarization. from 0.8 um step height in previous art, to 0.06 um step height with the process of the present invention.

COMPARISON EXAMPLE 3

Comparison Example 1 is repeated except that the harder Pedro pad is employed. Copius black debris formation is observed during polishing, and the aluminum film becomes extremely scratched, deeming it useless for microelectronics applications. The step height after polishing is 0.2 um, still too large for most applications.

Comparing Example 2 with Comparison Example 3 demonstrates the significance of the present invention. For instance, the polyelectrolyte additive not only improves planarization, but by dispersing the black debris. permits the use of harder pads. Black debris consists of aluminum particles removed by polishing. They develop the hard native oxide on their surfaces, which scratches the wafer. The polyelectrolyte binds on these particles, coats them, and prevents their scratching action, according to the present invention. In fact, when using the procedure of Example 2 on the first level of metallization, the short yield according to Example 2 pursuant to the present invention was at least 95%: whereas when using that of Comparison Example 3 on the first level of metallization, the short yield from Comparison Example 3 due to the severe scratching was 0%.

What is claimed is:

1. A polish slurry comprising abrasive particles and exhibiting normal stress effect and further comprising polyelectrolyte having ionic moieties of a charge that differs from that associated with said abrasive particles and wherein the concentration of said polyelectrolyte is about 5 to about 50 percent by weight of said abrasive particles and wherein said polyelectrolyte has a molecular weight of about 500 to about 10,000.

2. The slurry of claim 1 wherein said polyelectrolyte comprises acidic groups.

3. The slurry of claim 1 wherein said polyelectrolyte comprises basic groups.

4. The slurry of claim 1 wherein said polyelectrolyte is a polyampholyte.

5. The slurry of claim 1 wherein said polyelectrolyte is polyethylenimine.

6. The slurry of claim 1 wherein said polyelectrolyte is selected from the group consisting of poly(acrylic acid), poly(methacrylic acid) and polymaleic acid.

7. The slurry of claim 1 wherein a fraction of said abrasive particles are pretreated to enhance their ability to adsorb said polyelectrolyte.

8. The slurry of claim 1 wherein a fraction of said abrasive particles are pretreated with an oxidant in an amount sufficient to enhance their ability to adsorb said polyelectrolyte.

9. The slurry of claim 8 wherein said oxidant is ferric nitrate.

10. The slurry of claim 1 which further comprises water-insoluble polymer particles.

11. The slurry of claim 1 which further comprises surfactant micelles.

12. The slurry of claim 1 wherein the particle size of said abrasive particles is about 30 to about 200 nm.

13. The slurry of claim 1 wherein the particle size of said abrasive particles is about 75 to about 100 nm.

14. The slurry of claim 1 wherein said abrasive particles are selected from the group consisting of alumina- ceria, silica and zirconia.

15. The slurry of claim 1 being an aqueous slurry.

16. The slurry of claim 1 which further includes a dual valent rare earth ion or suspension of its colloidal hydroxide.

17. The slurry of claim 1 being a non-aqueous slurry.

18. The slurry of claim 1 wherein said polyelectrolyte is capable of dispersing polishing debris.

19. The slurry of claim 1 wherein said polyelectrolyte is anionic and has a molecular weight of about 1,000 to about 5,000.

20. The slurry of claim 1 wherein said polyelectrolyte is anionic and has a molecular weight of about 2,000.

21. The slurry of claim 1 wherein said polyelectrolyte has a molecular weight of about 1,000 to about 5.000 and is cationic.

22. The slurry of claim 1 wherein said concentration is 15 to about 25 percent.

23. An abrasive composition comprising abrasive particles and a polyelectrolyte having ionic moieties of a charge that differs from that associated with said abrasive particles and wherein the concentration of said polyelectrolyte is about 5 to about 50 percent by weight of said abrasive particles and wherein said polyelectrolyte has a molecular weight of about 1000 to about 5000.

24. A process for preparing the slurry of claim 1 which comprises adding said polyelectrolyte to a slurry containing said particles to thereby coat a fraction of said abrasive particles in situ.

25. A process for preparing the slurry of claim 1 which comprises precoating a portion of said abrasive particles and then admixing the precoated abrasive particles with a slurry of the remaining portion of said abrasive particles to thereby produce said slurry.

26. A process for preparing the slurry of claim 1 which comprises pretreating a portion of the abrasive particles to render them more susceptible to adsorption of a polyelectrolyte from the slurry.

27. A method for polishing a surface which comprises providing on said surface a slurry comprising abrasive particles and exhibiting normal stress effect and further comprising a polyelectrolyte having ionic moieties of a charge that differs from that associated with said abrasive particles and wherein the concentration of said polyelectrolyte is about 5 to about 50 percent by weight of said abrasive particles and wherein said polyelectrolyte has a molecular weight of about 500 to about 10,000.

28. The method of claim 27 wherein said polishing pad is a stiff polishing pad.

29. A method for polishing a surface which comprises providing on said surface a slurry comprising abrasive particles and a polyelectrolyte having ionic moieties of a charge different from that associated with said abrasive particles and wherein the concentration of said polyelectrolyte is about 5 to about 50 percent by weight of said abrasive particles; and planarizing said surface by contacting it with a polishing pad and wherein said polyelectrolyte has a molecular weight of about 500 to about 10,000.

30. The method of claim 29 wherein said polishing pad is a stiff polishing pad.

31. The method of claim 29 wherein said polyelectrolyte further disperses polishing debris to thereby reduce scratching caused by said debris.

32. The method of claim 29 wherein said surface is a microelectronic wafer.

33. The method of claim 29 wherein said surface is a mirror or lens.

34. The method of claim 29 wherein a fraction of said abrasive particles are pretreated with an oxidant in an amount sufficient to enhance their ability to adsorb said polyelectrolyte.

* * * * *

UNITED STATES PATENT AND TRADEMARK OFFICE
CERTIFICATE OF CORRECTION

PATENT NO. :   5,876,490
DATED      :   March 2, 1999
INVENTOR(S):   Ronay

It is certified that error appears in the above-identified patent and that said Letters Patent is hereby corrected as shown below:

Title Page, [73] Assignee: should read ---International Business Machines Corporation---.

Signed and Sealed this

Fifteenth Day of June, 1999

Attest:

Q. TODD DICKINSON

*Attesting Officer*    Acting Commissioner of Patents and Trademarks